US005838569A

United States Patent [19]

Gane

[11] Patent Number: 5,838,569

[45] Date of Patent: Nov. 17, 1998

[54] METHOD OF DIGITIZING AND CUTTING UP REMNANTS OF NON-REPETITIVE SHAPES

[75] Inventor: Pierre Gane, Pont de la Maye, France

[73] Assignee: Letra Systemes, Cestas, France

[21] Appl. No.: 732,220

[22] PCT Filed: Apr. 27, 1995

[86] PCT No.: PCT/FR95/00551

§ 371 Date: Oct. 25, 1996

§ 102(e) Date: Oct. 25, 1996

[87] PCT Pub. No.: WO95/29046

PCT Pub. Date: Nov. 2, 1995

[30] Foreign Application Priority Data

Apr. 27, 1994 [FR] France .................................. 94 05083

[51] Int. Cl.[6] .................................................... G06F 15/46

[52] U.S. Cl. ................ 364/470.05; 83/936; 364/470.06; 364/474.09

[58] Field of Search ......................... 364/474.09, 474.13, 364/470.05, 470.06, 468.21; 382/111; 83/522.11–522.29, 936–941

[56] References Cited

U.S. PATENT DOCUMENTS

| | | | |
|---|---|---|---|
| 4,941,183 | 7/1990 | Bruder et al. | 83/522.11 X |
| 4,961,149 | 10/1990 | Scheider et al. | 364/474.09 |
| 5,089,971 | 2/1992 | Gerber | 364/470.05 |
| 5,333,111 | 7/1994 | Chaiken et al. | 364/474.13 |

FOREIGN PATENT DOCUMENTS

| | | |
|---|---|---|
| 0342364 | 11/1989 | European Pat. Off. . |
| 0389319 | 9/1990 | European Pat. Off. . |
| 0577842 | 1/1994 | European Pat. Off. . |
| 2548077 | 1/1985 | France . |
| 2564708 | 11/1985 | France . |
| 4111304 | 10/1991 | Germany . |
| 2092501 | 8/1982 | United Kingdom . |
| WO 90/02640 | 3/1990 | WIPO . |
| WO 92/08811 | 5/1992 | WIPO . |

*Primary Examiner*—Joseph Ruggiero
*Attorney, Agent, or Firm*—Jones & Askew, LLP

[57] ABSTRACT

Sheet materials in the form of remnants of non-repetitive shapes and that might be flawed, e.g. hides (10), are cut up using a method that includes the following operations: digitizing the geometrical shape of each remnant; defining a layout for pieces to be cut out from the remnant; and cutting out the pieces from the remnant in compliance with the resulting layout. The surface of the remnant (10) is provided with marks characteristic at least of the disposition and of the orientation of the remnant during digitization. The marks are detected so as to generate and record position information representative of the positions of the first marks. At the cutting-out station (300), images of the marks in the positions defined by the recorded first position information are projected onto a work surface, and the corresponding remnant is placed on the work surface by bringing together the marks carried on the surface of the remnant and their projected images, so as to cut out the pieces from the remnant in a disposition and an orientation similar to those which it had during digitization.

27 Claims, 9 Drawing Sheets

METHOD OF DIGITIZING AND CUTTING UP REMNANTS OF NON-REPETITIVE SHAPES

The present invention relates to a method of cutting up sheet material in the form of remnants (i.e. short lengths) of non-repetitive shapes and that might have flaws of different types and seriousness. More precisely, the invention relates to a method that includes the following operations: digitizing the configuration of each remnant so as to generate and record graphics information representative of the shape of the remnant; defining a layout for pieces to be cut out from the remnant so as to use the surface area of the remnant optimally; and cutting out the pieces from the remnant in compliance with the resulting layout.

A particular field of application of the invention is that of cutting up hides, in particular in the shoe industry, the clothing industry, or the furniture industry. But the invention may be used for other natural or synthetic sheet materials, in particular those that are likely to be in the form of remnants having shapes that vary from one remnant to another.

In this type of application, a major constraint must be satisfied. For each step of the method: digitization, layout, and cutting out, the remnant must have the same dimensional characteristics, and must be disposed in the same way relative to the frames of reference of the work zones used.

With hides, it has been observed that after a hide has been handled to transfer it from one work zone to another, it is very difficult to maintain exactly the same configuration and the same disposition. One reason for this lies in dimensional variations due to various factors, and in particular the property of certain portions of the hide (legs, neck) to be deformed easily without returning spontaneously to their original shapes. It is immediately apparent that cutting out cannot be satisfactory if it is performed in a hide whose shape is different from the shape that was digitized in order to define the layout on the basis of which cutting out is to be performed.

To overcome this difficultly, one solution consists in using the same work surface for all of the operations, namely digitization, layout definition, and cutting out. The hide is not handled and therefore there is no risk of deformation. Unfortunately, choosing such a compact solution is detrimental to the modularity of the installation, to its operating flexibility, and to its throughput, since the various operations must be performed sequentially.

Another known solution consists in using different work stations for digitization, layout, and cutting out to give greater modularity, operating flexibility, and throughput, it being possible for there to be different numbers of digitizing, layout, and cutting-out stations depending on needs. Unfortunately, it is necessary to use means for transferring the hides between the various stations, e.g. trolleys for transporting rigid supports on which the hides are fixed, requiring complex and costly logistics to be implemented in order to ensure that the hides flow correctly between the work stations Moreover, in order to limit the number of hide transfers to as few as possible, the layout is generally defined blind, i.e. without directly inspecting the hides.

An object of the invention is to avoid the above-mentioned drawbacks by providing a method of cutting up remnants that makes it possible to maintain a modular configuration and high operating flexibility for the installation without having to use restrictive and costly means for holding the remnant in the same configuration or disposition.

The invention achieves this object by providing a method of the type defined at the beginning of the description, and which includes the following steps:

providing the surface of the remnant with first marks characteristic at least of the configuration of the remnant during digitization;

detecting the first marks so as to generate first position information representative of the positions of the first marks;

recording the first position information corresponding to the remnant whose configuration has been digitized;

projecting onto a work surface images of the first marks in the positions defined by the recorded first position information; and placing the corresponding remnant on the work surface by bringing together the marks carried on the surface of the remnant and their projected images, so as to cut out the pieces from the remnant in a configuration similar to that which it had during digitization.

Thus, throughout the method, the configuration of the remnant is guaranteed to be maintained by associating the recording of the digitized image with the recording of the images of first marks which are characteristic specifically of the configuration of the remnant while digitization is taking place, the marks being, for example, situated in positions in which they are most likely to show up dimensional variations or deformations in the remnant. Advantageously, the first marks further include marks characteristic of the disposition of the remnant relative to a frame of reference used during digitization, such as marks characteristic of at least one of the elements, e.g. an axis, of the frame of reference used for digitization. In this way, not only the configuration, but also the disposition of the remnant relative to the frame of reference can be maintained. The first marks are, for example, in the form of adhesive patches which may have different shapes depending on whether they are characteristic of the configuration or of the disposition of the remnant.

Transferring and optionally temporarily storing the remnants between the digitizing station(s), the layout station(s), and the cutting-out station(s) can then be performed as simply as possible.

Advantageously, the method further includes the following steps:

providing the surface of the remnant with second marks indicating the locations of flaws on the remnant as digitized;

detecting the second marks so as to generate second position information representative of the locations of the flaws;

recording the second position information corresponding to the remnant whose configuration is digitized; and using the graphics information representative of the shape of the remnant and the second position information so as to display an image representing the remnant and the locations of the flaws, so as to define the layout while taking into account any flaws on the remnant.

The second marks indicate, for example, the outlines of the flawed zones of the remnant. Their presence on the surface of the remnant is no longer necessary after they have been detected. They may be constituted by pieces of string or analogous objects which are removed on transferring the remnant away from the digitizing station.

In order to give fuller assistance to defining the layout, the method may further include the following steps:

providing the surface of the remnant with third marks situated at the locations of the flaws on the remnant and indicating the seriousness of the flaws;

detecting the third marks so as to generate flaw information representative of the seriousness of the flaws;

recording the flaw seriousness information corresponding to the flaws whose locations are represented by the second position information; and using the flaw seriousness information to display an indication of the seriousness of the corresponding flaw at each of the locations of the flaws on the image representing the remnant and the locations of the flaws.

An operator defines the layout by looking at an image of the remnant on a screen and by entering data and/or commands by means of apparatus, such as a mouse or a keyboard, providing an interface with a data-processing system. The screen and the interface apparatus may be mounted to move along a table, a bench, or some other support on which the remnant may be disposed, so as to enable the operator to see simultaneously the image of the location of a flaw and the same flaw as it really appears on the surface of the remnant.

It is then easier for the operator to decide to what extent the flaw must be taken into account in defining the layout, depending on the real seriousness and real shape of the flaw, and depending on whether the presence of the flaw or a fraction thereof in some portion of a piece to be cut out constitutes a drawback in view of the use that is to be made of the piece.

The marks carried by the surface of the remnant and their images as projected onto the work surface are brought together until they are made to coincide.

When it is impossible to achieve such coincidence, the differences between the respective positions are measured, the graphics information and the first position information as recorded are modified by geometrical transformation as a function of the differences as measured, so as to comply with the real positions of the marks as carried by the surface of the remnant on the work surface, and, where applicable, the layout is modified accordingly.

The second position information representative of the locations of any flaws observed on the surface of the remnant is modified by the same geometrical transformation.

The invention will be better understood on reading the following description of an implementation given by way of non-limiting example and with reference to the very diagrammatic accompanying drawings, in which:

FIG. 7 is a side elevation view of the handling zone of the cutting-out station of the FIG. 1 installation during a feed stage in which the remnant to be cut up is fed in;

Figure 9A:
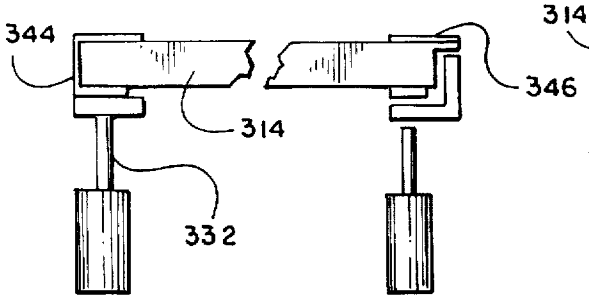
FIGS. 9A to 9D show successive stages of a remnant feeding, cutting-up, and unloading cycle in the handling zone of the FIG. 1 cutting-out station.
Figure 9B:
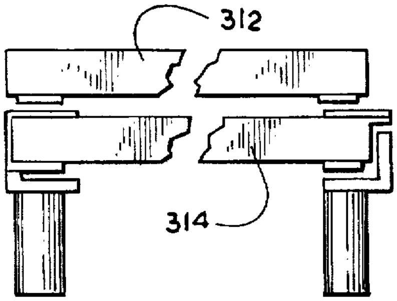
Figure 9C:
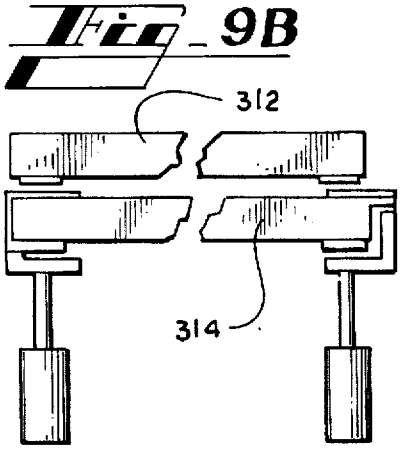
Figure 9D:
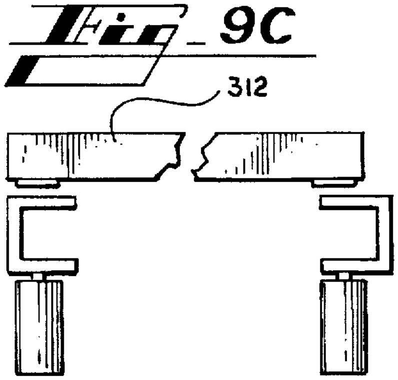
Figure 10A:
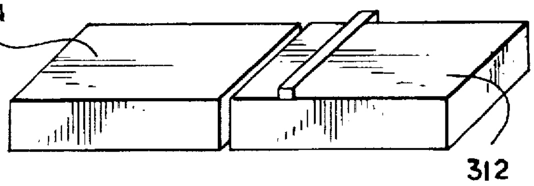
Figure 10B:
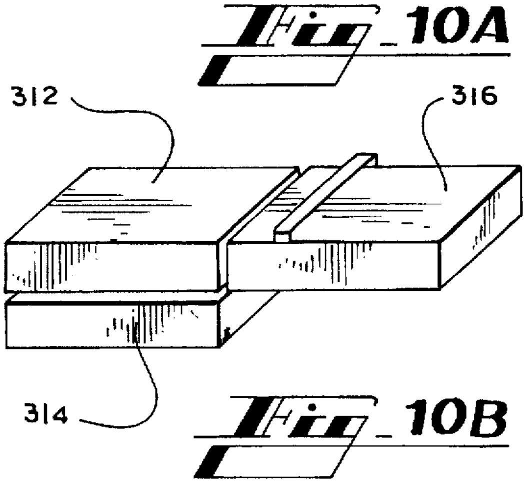
Figure 10C:
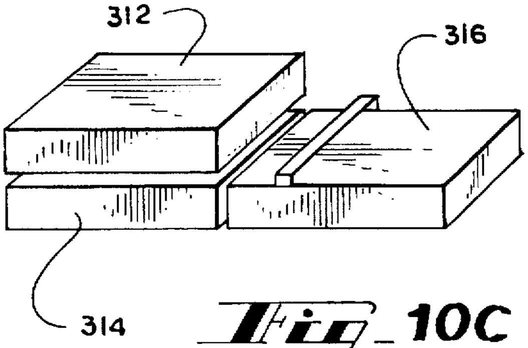
Figure 10D:
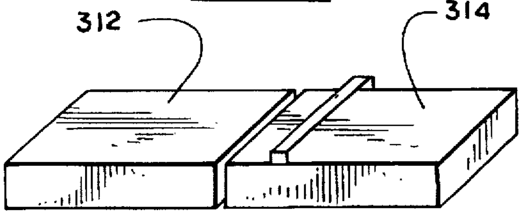
Figure 11:
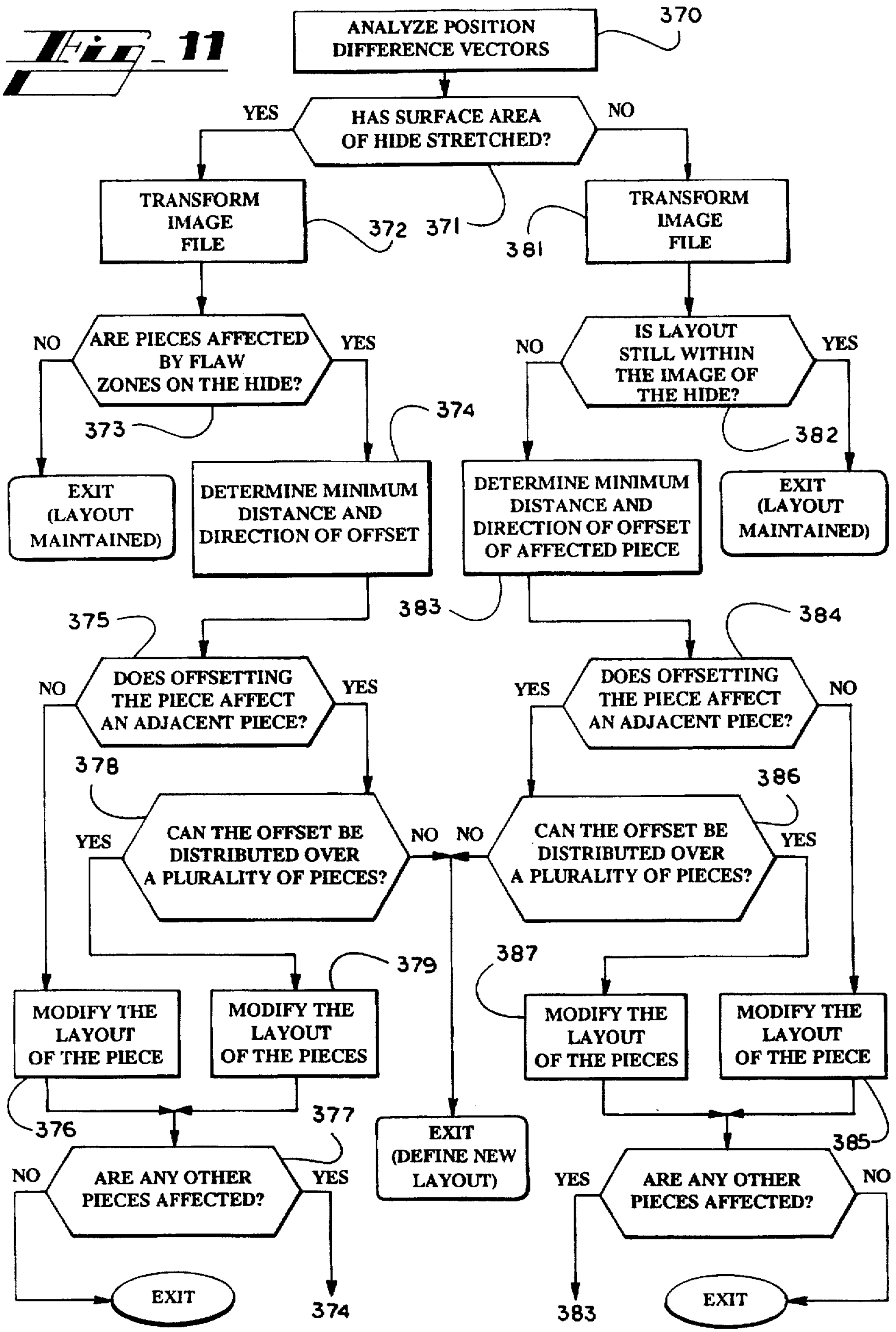

FIGS. 10A to 10D respectively correspond to FIGS. 9A to 9D and show the successive positions of the remnant in the handling zone during the successive stages of a remnant feeding, cutting-up, and unloading cycle; and FIG. 11 is a flow chart showing what happens during a positioning stage in which a remnant is positioned on a work surface of a cutting-out station, when it is impossible to make marks carried by the remnant coincide with images of said marks projected onto the remnant and coming from an image file generated on digitizing the remnant.

In the following description, an implementation of the method of the invention is described as applied to cutting up hides, e.g. for manufacturing shoes. Naturally, as indicated at the beginning of the description, the method may be used for cutting up remnants made of natural or synthetic materials other than hides, and for applications other than to the shoe industry.

Figure 1:
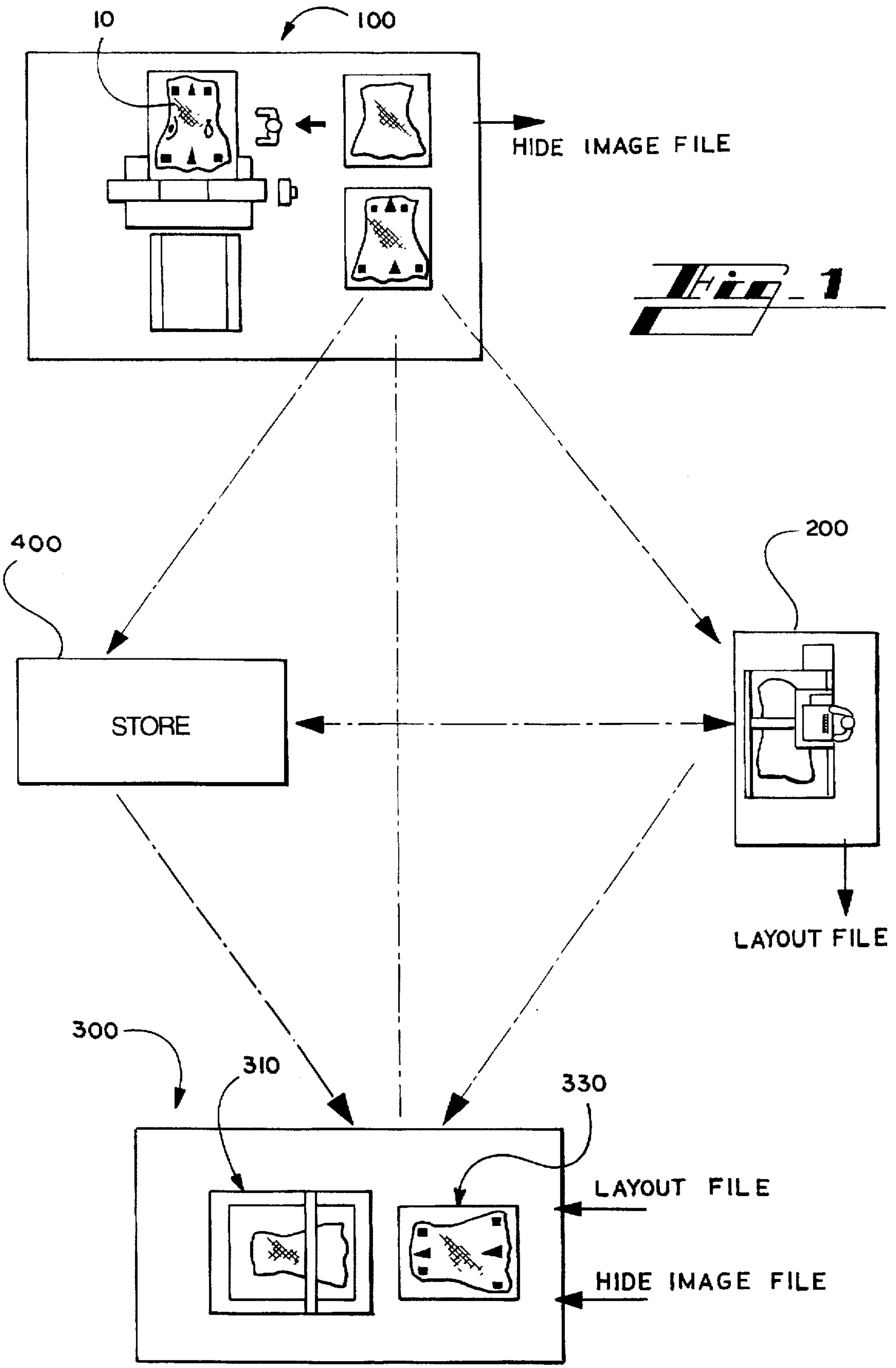
FIG. 1 shows how implementing the method of the invention may be organized.

An advantage of the method of the invention is that it can be implemented by means of modular equipment such as the equipment shown in FIG. 1. This equipment comprises a digitizing station 100, a layout station 200, a cutting-out station 300, and a store 400.

At the digitizing station 100, image files are generated that contain, in particular, for each hide 10: graphics information representing the shape of the hide; hide position information characteristic of the configuration of the hide and of its disposition during digitization, and of the positions of any flaws observed on the hide; information characteristic of the seriousness of the flaws; and information identifying the hide.

At the layout station 200, layout files are generated that contain, in particular, for each hide, information identifying the locations and outlines of the pieces to be cut out from the hide, information identifying the pieces to be cut out, and information identifying the hide. The layout file is generated under the control of an operator in the presence of the image of the hide as displayed using the image file information. The operator may also be able to see the hide itself.

At the cutting-out station 300, each hide is cut up in compliance with the information contained in the corresponding layout file. The hide as provided with positioning marks is disposed on a work surface of the cutting-out station in compliance with the hide position information which is contained in the corresponding image file and whose images are projected onto the work surface.

The dashed arrows indicate how the hides are transferred between the stations 100, 200, and 300, and the store 400. After being digitized, the hides may be transferred to the layout station 200 (when laying out is to be performed in the presence of the hide), or directly to the cutting-out station 300 (when laying out is performed solely by looking at the image recorded in the image file), or else to the store 400 for temporary storage. Laying out is performed on hides coming from the digitizing station 100 or from the store 400. After laying out, the hides are transferred to the cutting-out station 300 or to the store 400. Cutting out is performed on the hides coming from the digitizing station 100, from the layout station 200, or else from the store 400.

The image files and the layout files may be stored on individual recording media, e.g. floppy disks, used at the layout station and at the cutting-out station. It is also possible to record the files in the central memory of a data-processing system to which the digitizing station, the layout station, and the cutting-out station are connected. The information identifying the hides, and contained in the image files and in the layout files, reproduces, for example, information appearing on a label stuck to the back of the hide, and containing in particular indications relating to the origin, nature, and destination of the hide, and a hide number.

Figure 2:
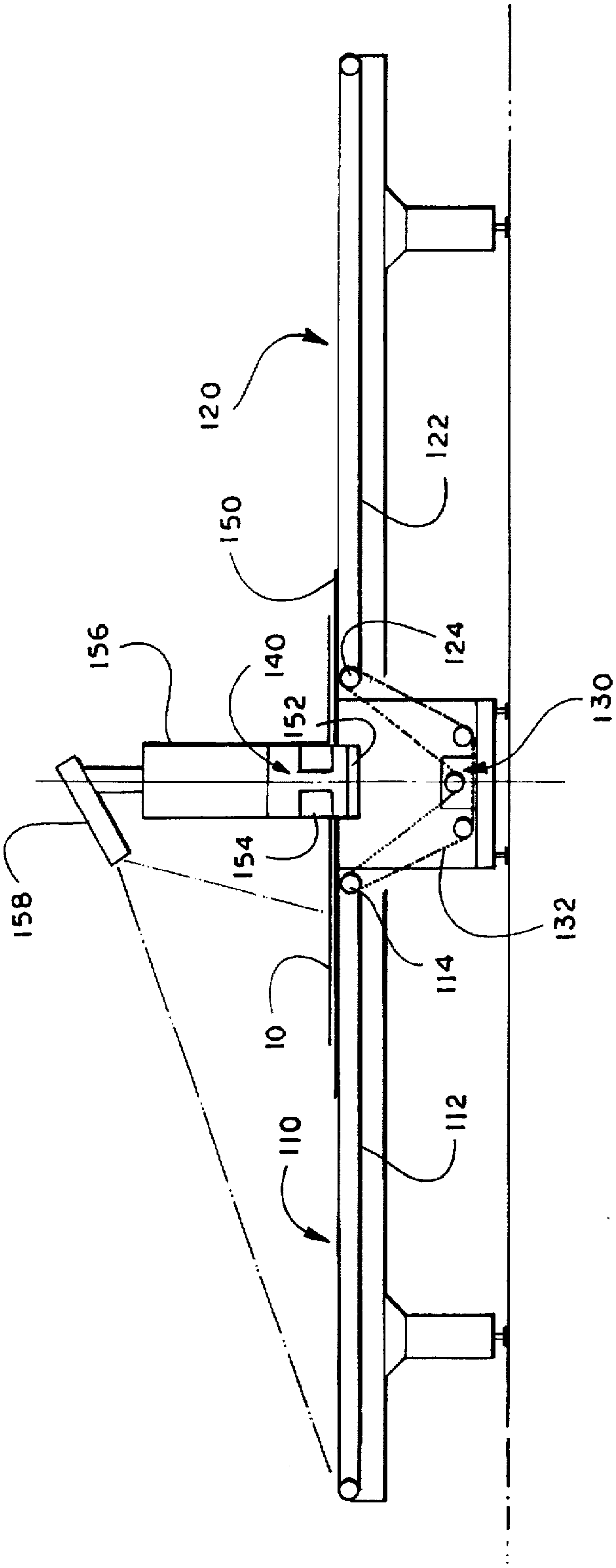
FIG. 2 is a side elevation view of the digitizing station of the FIG. 1 installation.
Figure 3:
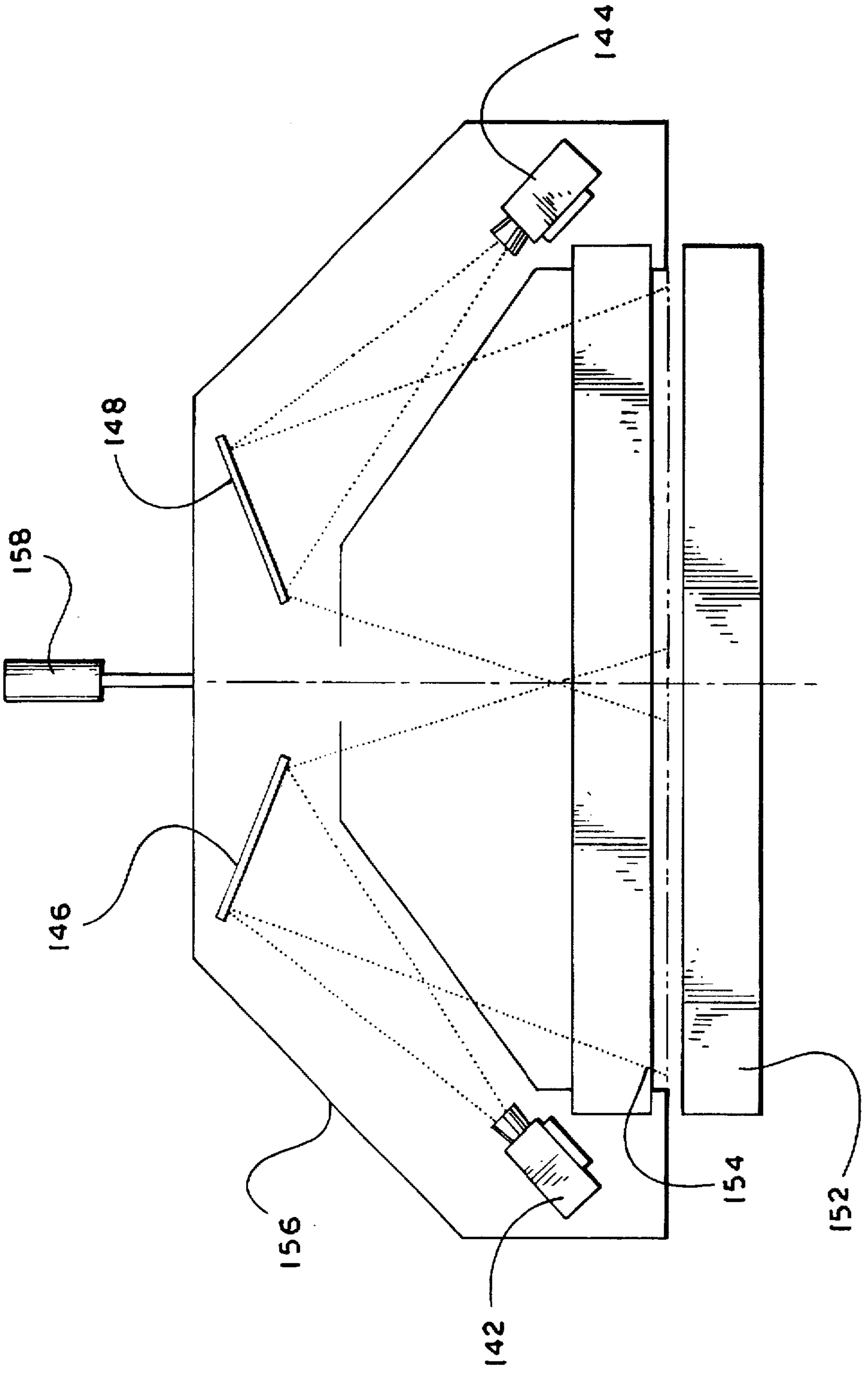
FIG. 3 is an end elevation view of the digitizing station of the FIG. 1 installation.
Figure 4:
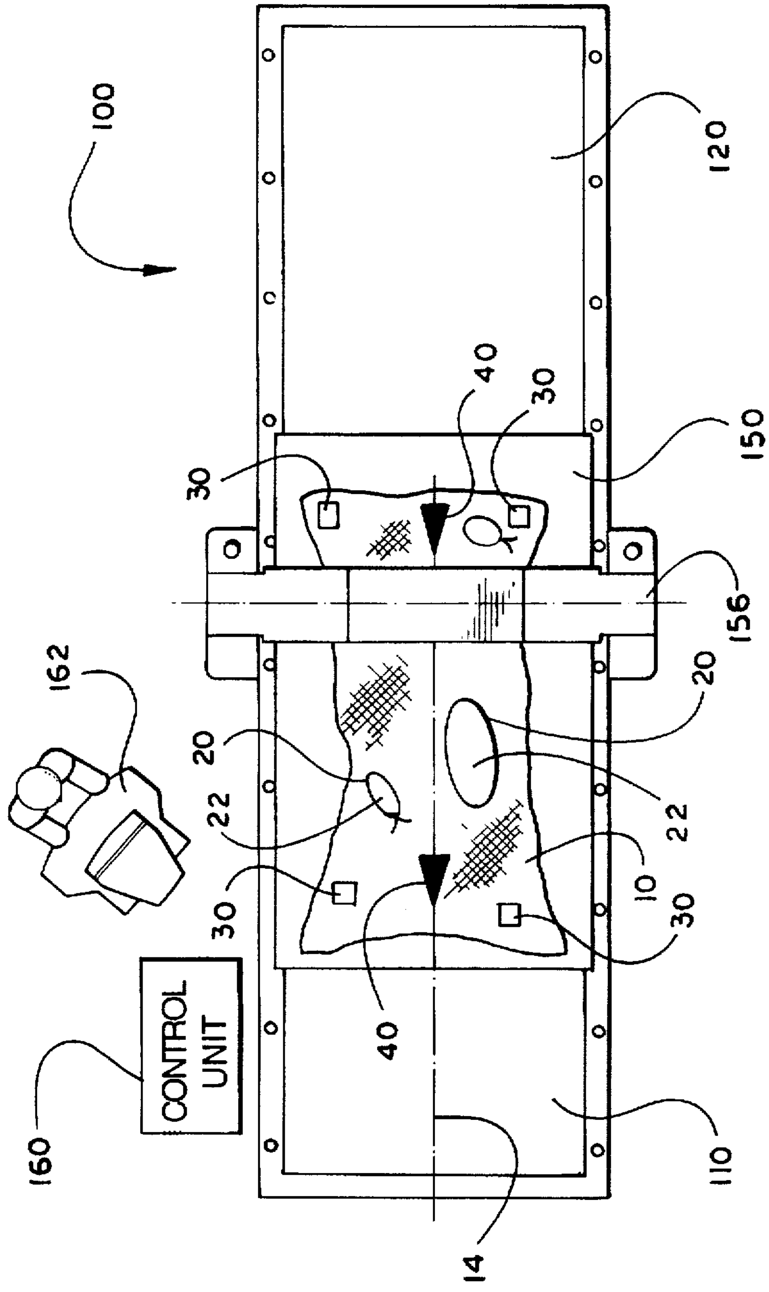
FIG. 4 is a plan view of the digitizing station of the FIG. 1 installation with a remnant undergoing treatment.

The digitizing station 100 is described below in more detail with reference to FIGS. 2 to 4.

Two coplanar and aligned horizontal conveyor tables 110 and 120 are separated by a zone 140 in which digitization is performed. The tables 110 & 120 are constituted by conveyors provided with endless conveyor belts, respectively 112 and 122. The driving rollers 114 & 124 of the two conveyors are coupled to a common drive motor 130 by means of a drive belt 132. The conveyor belts 112 & 122 can thus be driven in either direction at a common regulated speed.

Digitization is performed by line-by-line scanning in the zone 140 while a hide 10 lying on a transparent rigid plate 150, e.g. made of glass, is being displaced from one conveyor table to the other by means of the motor 130. The scanning direction Y is perpendicular to the displacement direction X of the hide 10.

Scanning is performed by means of two linear cameras 142 and 144 which, by means of respective mirrors 146 and 148, scan respective segments, each of which extends over about one half of the width of the digitizing zone. As shown in FIG. 3, the segments scanned by the cameras may overlap each other in part in the central portion of the digitizing zone. In the zone 140, a bottom lighting box 152 is situated under the plate 150. It provides a strong contrast between the surface of the hide, as seen from above, and the plate 150. A top lighting box 154 is situated above the plate. It is in fact constituted by two half-boxes disposed on either side of the vertical plane containing the line scanned by the cameras 142 & 144, and it provides a strong contrast between the surface of the hide and marks situated on said surface, as indicated below.

The cameras 142 & 144, and the mirrors 146 & 148 are mounted on a gantry 156 which straddles the digitizing zone 140. The gantry 156 further supports a projector 158 for projecting a light beam, such as a laser beam, onto one of the conveyor tables, e.g. table 110, which beam scans a sector situated in the longitudinal midplane of the table 110. In this way, a luminous mid-line 14 parallel to the direction X is formed on the table 110 or on a hide 10 situated thereon.

The image file associated with a hide 10 is generated in the digitizing station 100 as follows.

The hide 10 is disposed flat on the plate 150 on the conveyor table 110 while said table is stationary.

While the hide 10 is lying on the table 110, a certain number of marks are placed on the hide by an operator as follows.

The operator looks for any flaws on the hide 10. The operator indicates the existence of any flaws by means of pieces of string 20 that define their outlines (FIG. 4), and indicates the seriousness of them by means of elements 22 placed in the centers of the zones delimited by the pieces of string. Depending on the seriousness of the flaws, the elements 22 may have different geometrical shapes and/or sizes, e.g. they may constituted by circles, polygons, stars with different numbers of points, etc.

The operator also places elements on the hide 10 making it possible to mark the disposition and to reproduce its configuration faithfully during subsequent operations.

The configuration is marked by marks 30 placed in positions in which, after the hide has been handled and optionally stored, they are most likely to show up dimensional variations or deformations of the hide. In particular, marks 30 are placed in critical zones that might not return to their original positions relative to the central zone of the hide, which zone retains its shape without any significant variations. Such critical zones are in particular end zones such as the legs or the neck. Other marks 30 may be distributed over the surface of the hide so as to detect any dimensional variation due, for example, to elongation resulting from forces being exerted accidentally on the hide, or else to a variation in humidity. For example, the marks 30 are adhesive patches and they are shaped differently from the elements 22.

The disposition or orientation of the hide 10 is marked by means of marks 40. With the projector switched on, the marks 40 are disposed so as to indicate the line of light formed on the hide 10. For example, the marks 40 are adhesive patches and they are shaped differently from the elements 22 and from the patches 30, e.g. they are triangular so as to constitute arrows.

Preferably, the elements 20 & 22, and the patches 30 & 40, are colored such that they contrast well with the color of the hide 10.

The automatic digitization cycle can then be triggered.

During a first stage, the hide 10, as supported by the plate 150, is displaced from table 110 to table 120. In the zone 140, it is lit from underneath by means of the box 152. The cameras 142 and 144 transmit to a control unit 160 (shown in FIG. 4 only) the signals making it possible to generate graphics information representing the outline of the hide. The lighting from underneath provides a strong contrast between the plate 150 and the entire surface of the hide 10, including the zones carrying elements or marks.

During a second stage, the hide 10, still supported by the plate 150, is displaced from table 120 to table 110 while it is this time lit from above in the zone 140. There is then a strong contrast between firstly the elements 20 & 22 and marks 30 & 40, and secondly the surface of the hide 10. The positions of the elements 20 & 22 and marks 30 & 40 are detected by the cameras 142 & 144 making it possible for the control unit 160 to generate hide position information (coordinates of the marks 30 & 40) and flaw information (shapes and locations of elements 20, and shapes and locations of elements 22).

The graphics information, the hide position information, and the flaw information is stored by the control unit 160, in association with hide identification information, so as to constitute the digital image file of the hide 10. The hide identification information, e.g. taken from a document accompanying the hide, is entered by the operator by means of a keyboard 162 connected to the control unit 160. In addition, the control unit controls the motor 130, the cameras 142 & 144, and the projector 158, under the control of the operator. At the end of the digitization stage, the system can print a label to be stuck on the hide and containing identification information identifying the hide, the digitizing station, the operation, the date of digitization, etc. in the form of text and/or bar codes.

The principle of the above-described digitizing apparatus, using linear cameras that scan line-by-line the surface to be digitized, is well known. Optionally a single camera may be provided scanning the entire width of the digitizing zone, by means of one or more mirrors.

Other known digitizing apparatus may be used, e.g. graphics input apparatus using a stylus whose instantaneous position is measured continuously, and which is used by an operator to describe the outline of the surface to be digitized or to indicate the positions of marks on the surface. Such apparatus using a system of ultrasonic transmitters and receivers to measure the instantaneous position of the stylus is described in Document FR-A-2 698 191.

Different types of apparatus may be combined, e.g. scanning digitizing apparatus for digitizing the outline of the hide, and graphics input apparatus using a stylus for recording the other information.

After digitization, the elements 20 & 22 can be removed from the surface of the hide 10, whereas the marks 30 & 40 must remain thereon.

Figure 5:
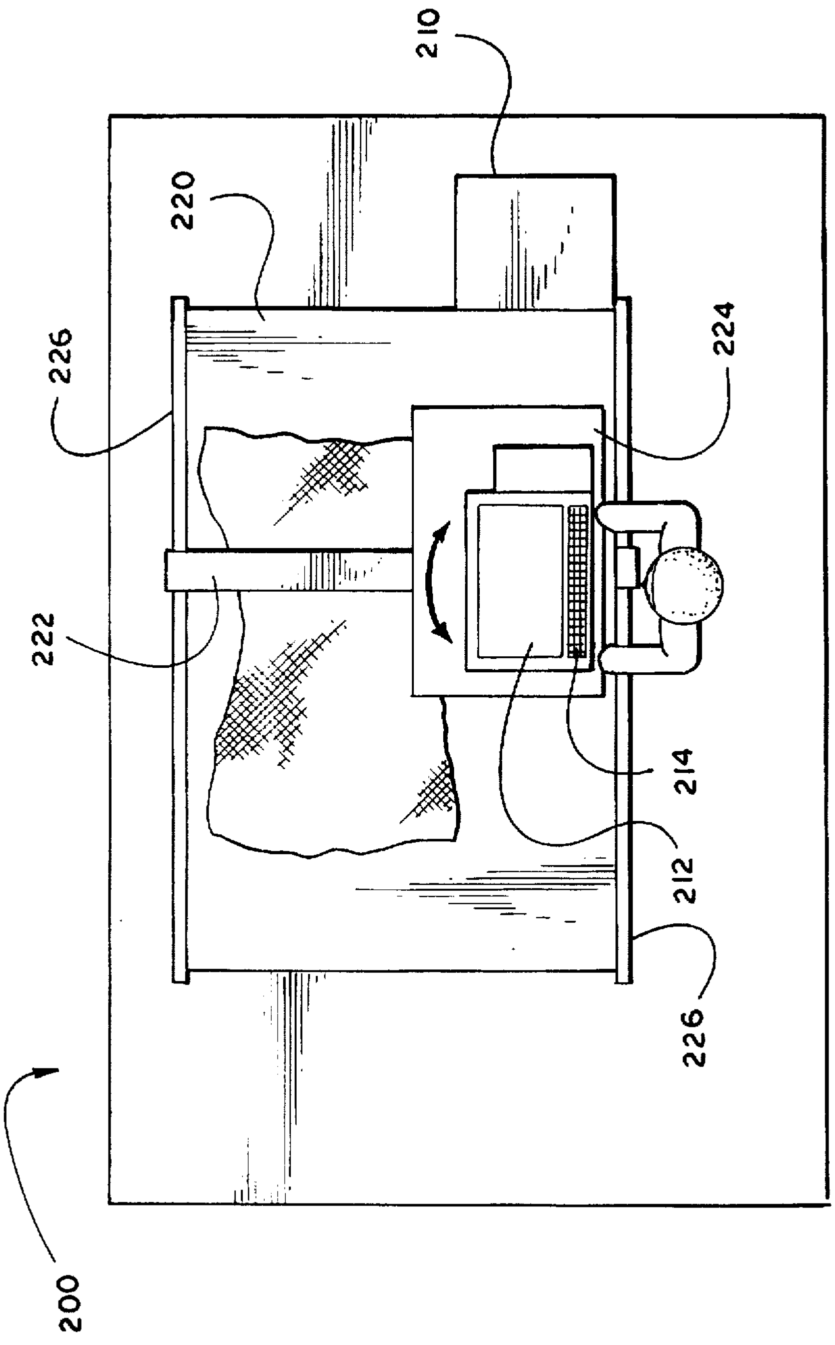
FIG. 5 is a plan view of the layout station of the FIG. 1 installation.

The layout station 200 (FIG. 5) includes a central processing unit 210 connected to a display screen 212 and to interface apparatus such as a mouse or a keyboard 214 enabling an operator to dialog with the central processing unit 210.

The laying-out operation consists in optimally determining the locations of predetermined pieces to be cut out from the hide as a function of the shape of the hide and of the existence of any flaws. It is performed by the operator with the image of the hide being displayed on the screen 212 on the basis of the information contained in the image file.

Depending on the seriousness of a flaw, the operator can decide whether or not to use all or part of a flawed zone of the hide for a particular portion of the piece to be cut out, it being possible for the presence of a flaw on a portion of a piece to be unimportant for the final product. For this purpose, the flaw seriousness information (images of elements 22) is displayed to assist the operator.

However, it may be advantageous to offer the operator the possibility of simultaneously inspecting the hide itself. To this end, the layout station 200 is provided with a support such as a bench or a horizontal table 220 on which the hide 10 may be deposited, without it being necessary for its configuration and its disposition to be marked accurately. A beam 222 is disposed perpendicular to the longitudinal direction of the support 220, and it is mounted to move parallel to said direction along guides 226 situated on the longitudinal sides of the table 220. A tray 224 supporting the screen 212 and the keyboard 214 is guided on the beam 222, and it can swivel about a vertical axis.

Thus, in particular when the operator is to take a decision on the use of a flawed zone of the hide, said operator can displace the screen 212 and the keyboard 214 and angularly position the tray so that it is possible for the operator to see the image of the flaw on the hide as digitized on the screen and at the same time the flaw as it really exists on the hide on the table. The possibility of displacing the tray 224 over the entire surface of the table 220 and of swivelling the tray and the screen thereon gives the operator the best possible working conditions regardless of the location of a flaw to be inspected.

Laying out is performed in a manner known per se so as to produce a layout file by means of the central processing unit 210, which file contains information characteristic of the locations and the outlines of the pieces to be cut out from the hide, and information relating to the structure of the resulting layout: names of models, sizes, designation of pieces, etc. The layout file further includes hide identification information as reproduced from the image file or as entered by the operator. The layout file may be associated or combined with the image file so as to have available, during cutting out, the graphics information, and the flaw and hide position information stored in the image file.

Figure 6:
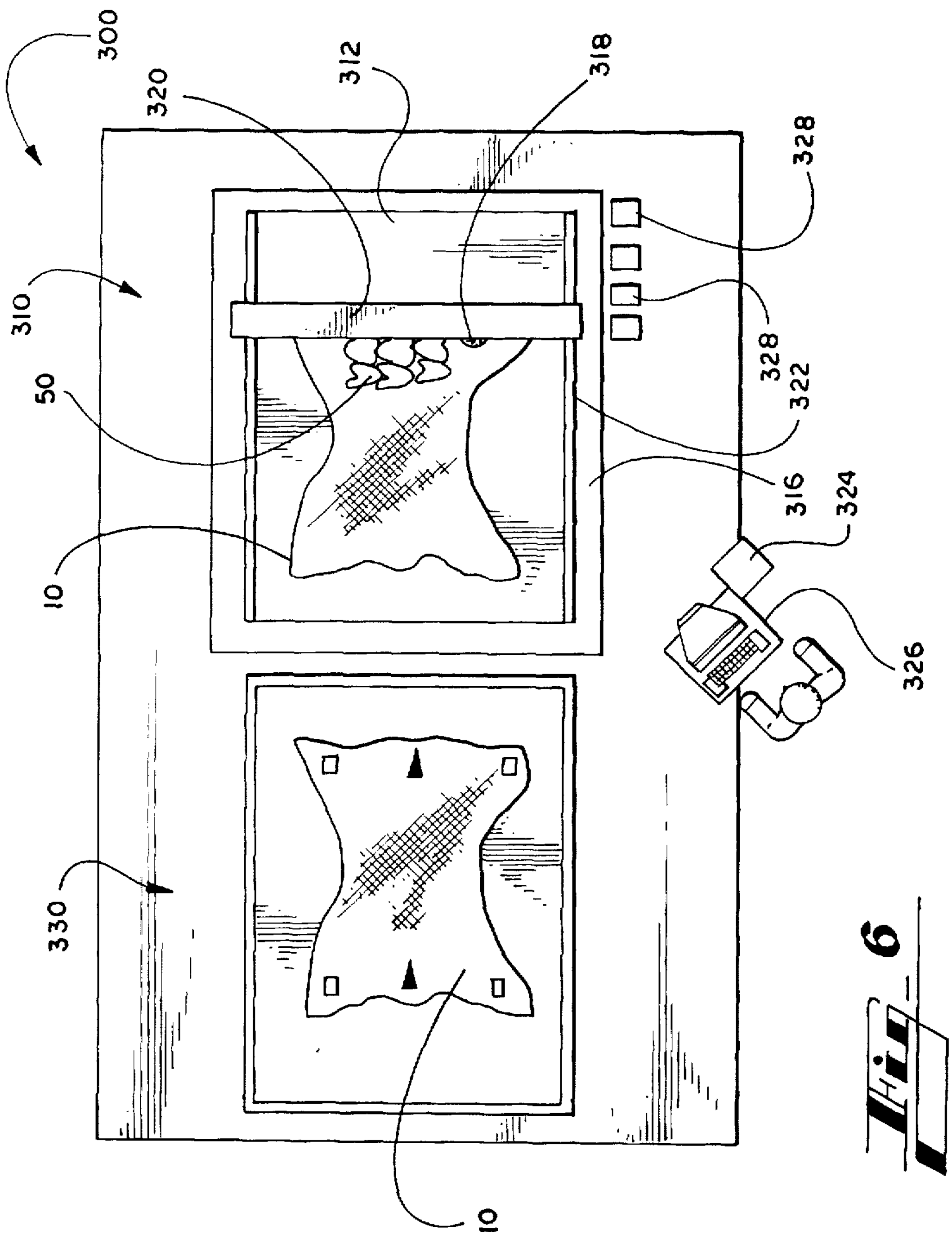
FIG. 6 is a plan view of the cutting-out station of the FIG. 1 installation.

The cutting-out station 300 (FIGS. 6 to 8) comprises cutting-out apparatus 310 and handling apparatus 330 (feeding and unloading hides) disposed one after the other. The hides are transferred automatically between the cutting-out apparatus 310 and the handling apparatus 330 on two identical trays 312 & 314 which pass alternately from one apparatus to the other.

The cutting-out apparatus 310 (shown in FIG. 6 only) may be of any known type. In the example shown, it includes a work table 316 on which the trays 312 & 314 carrying hides to be cut up are positioned accurately and alternately. A cutting tool, e.g. a high-pressure fluid ejection nozzle, a vibrating blade, or a laser generator is carried by a cutting head 318. The cutting head is mounted to move along a beam 320 that extends in the direction Y perpendicular to the longitudinal direction X of the table 316 and of the hide 10. The beam 320 is mounted to move in direction X while being guided at its ends on bars 322 that extend parallel to the longitudinal edges of the table 316.

Actuating the cutting tool and displacing it in direction X and in direction Y are controlled by signals produced by a central processing unit 324 as a function of information contained in the layout file and characteristic of the locations and of the outlines of the pieces 50 to be cut out.

When cutting out is performed by a high-pressure fluid jet, e.g. a water jet, or by laser, it is not necessary to secure the hide to the tray 312 or 314. This is not the case with a vibrating blade.

To cut out the pieces, it is necessary for the hide to have the same configuration as that which it had during digitization, and the same disposition, relative to the frame of reference X,Y of the cutting-out apparatus 310, as that which it had during digitization, relative to the frame of reference X,Y of the digitizing station. The configuration and the disposition of the hide are monitored at the handling apparatus 330 (FIGS. 7 and 8).

Figure 8:
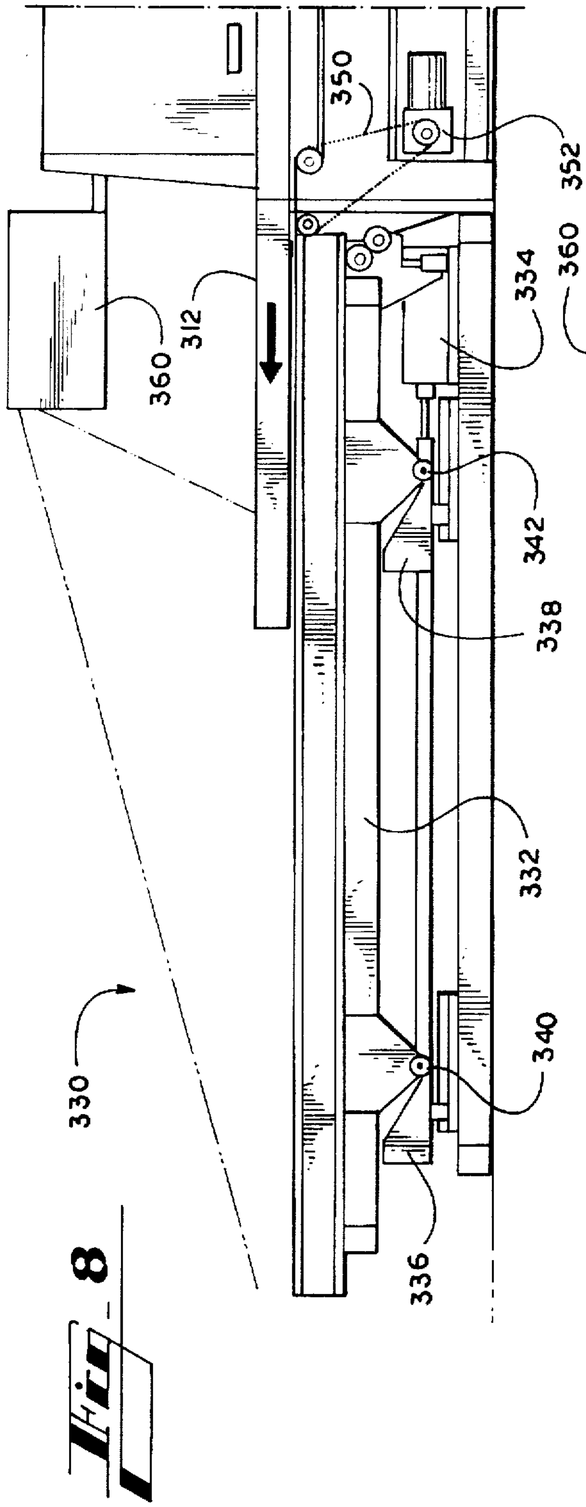
FIG. 8 is a view analogous to the FIG. 7 view, but during an unloading stage in which a cut-up remnant is unloaded.

The handling apparatus 330 includes a carriage 332 that is mounted to move vertically between a high position (FIG. 7) and a low position (FIG. 8). The vertical displacement of the carriage 332 is controlled by an actuator 334 that acts horizontally to displace ramps 336 & 338 on which the wheels 340 & 342 of the carriage roll.

Projection apparatus 360 is mounted on the handling apparatus 330. The projection apparatus 360 is connected to the central processing unit 324 so as to project onto a tray supported by the carriage 322 a life-size image obtained on the basis of the hide position information read from an image file, or an image obtained on the basis of information read from a layout file. For example, the projection apparatus 360 includes a laser beam generator which, in a manner known per se, sequentially and repetitively illuminates points constituting the image to be projected that is visible by persistence of the eye. The projection apparatus could also include a screen on which the image to be projected is displayed associated with a mirror reflecting it towards the surface of the tray carried by the carriage.

Figure 7:
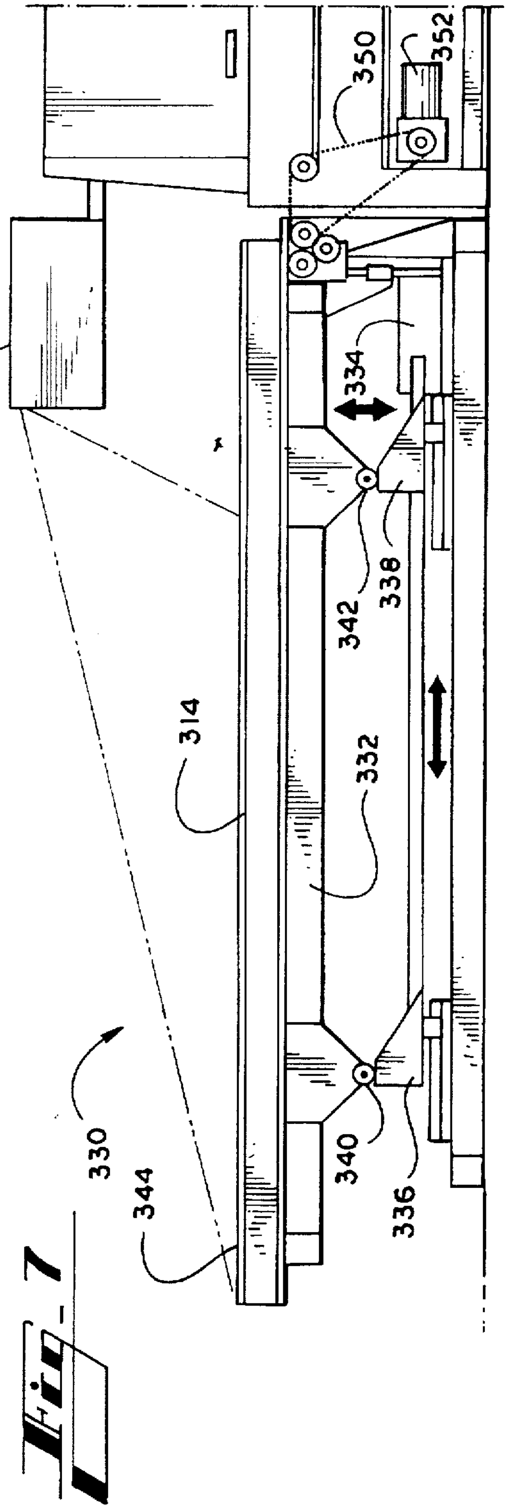

A new hide 10 to be cut up, carrying marks 30 & 40 is disposed on a tray, e.g. 314 carried by the carriage 332 in the high position (FIG. 7). At the same time a hide in the cutting-out apparatus 310 can be cut up on the tray 312.

The projection apparatus 360 is controlled by the operator via a keyboard 326 connected to the central processing unit 324 so as to project onto the hide 10 the images of the marks 30 and 40 as obtained on the basis of the hide position information stored in the image file. The projection apparatus 360 is organized such that the locations of the projected images are characteristic of the configuration and of the disposition to be exhibited by the hide 10 after it has been transferred on the tray 314 to the cutting-out apparatus. The operator must then cause the marks 30 and 40 carried by the hide 10 to coincide with their respective images. The marks 30 coinciding with their images makes it possible to ensure that the initial configuration of the hide is maintained.

The marks 40 coinciding with their images makes it possible to ensure that the orientation of the hide is maintained. It should also be noted that the marks 40 make it possible to define not only an axis X, but also an origin on the axis, e.g. a point occupying a fixed or predetermined position relative to one and/or the other of the marks 40. The adhesive patches embodying the marks 30 and 40 may then be removed prior to cutting out.

Once a hide to be cut up has been positioned accurately on the tray 314 and once at the same time a hide has been fully cut up on the tray 312, the positions of the trays are interchanged, as shown diagrammatically in FIGS. 9A to 9D and 10A to 10D.

The positions of the hides, immediately before they are interchanged are shown in FIGS. 9A and 10A. To interchange them, the carriage 332 is lowered with the tray 314 (FIGS. 7 to 9B), and the tray 312 carrying the cut-up hide is transferred from the cutting-out apparatus 310 to the handling apparatus 330. The carriage 332 carries longitudinal channel-section slideways 344 & 346 in which the longitudinal edges of the trays 314 are inserted. Tray 312 is brought to a position above the slideways 344 & 346. Tray 312 carries skids 313 on which it slides on the top flanges of the slideways 344 & 346, while tray 314 rests via skids 315 on the bottom flanges of the slideways 344 & 346.

Tray 312 is displaced by drive belts 350 that drive pinions engaging racks fixed under the tray (FIG. 8). The drive belt 350 is driven by a motor 352 controlled by the central processing unit 324.

Once tray 312 has been brought fully onto the handling apparatus 330 (FIGS. 9B and 10B) the carriage 332 is brought to the high position (FIGS. 9C and 10C). The tray 314 carrying the hide to be cut up can then be transferred to the cutting-out apparatus by means of the conveyor belt 350 being displaced in the reverse direction. The height of the slideways 334 & 346 and the amplitude of the vertical displacement of the carriage 332 are determined so as to bring the top flanges and the bottom flanges of the slideways 344 & 346 alternately to the level of the top run of the conveyor belt 350.

Once tray 314 has been brought fully onto the cutting-out apparatus 310, the carriage 332 is returned to the low position (FIGS. 9D and 10D), and the cut-out pieces can be unloaded by an operator.

Advantageously, unloading is assisted by projecting onto the cut-up hide an image including elements for identifying the cut-out pieces, the image elements being projected onto the locations of the pieces, and being, for example, image elements characteristic of models, sizes and/or piece designations. The projection is performed by means of the projection apparatus 360 on the basis of the information contained in the layout file.

By way of example, each of the shoe models for which the cut-out pieces are to be used may be identified by the image of a particular simple geometrical shape (circle, polygon, cross) which is projected onto the centers of the corresponding pieces, and each size is indicated by the dimension of the projected image. In order to make it simpler to sort the cut-out pieces, the projection on the cut-up hide may be controlled sequentially under the control of the operator, by progressing model-by-model, and, for each model, size-by-size. To this end, the operator advantageously has a remote control box (not shown) connected to the central processing unit 324 to avoid having to go backwards and forwards between the keyboard 326 and the tray carrying the cut-up hide. The collected pieces are put in different bins 328 depending on the models and sizes of the pieces they are to receive, which bins are respectively marked with the same symbols as those whose images are projected onto the cut-up hide to facilitate sorting.

In particular after prolonged storage or repeated handling operations, it might be impossible for the hide position marks 30 & 40 carried by the hide to be made to coincide exactly and to the desired degree of accuracy with the images of the marks projected onto the hide on the handling apparatus, because of an irreversible variation in the configuration of the hide.

In which case, it might be necessary to correct the layout in order to match it to the new configuration of the hide, as a function of the differences observed between the positions of the marks 30 & 40 and those of their respective images. Measuring these differences and their signs may be performed in various ways, the hide being placed so that the largest difference has the smallest possible value.

A first possibility consists in supplying the central processing unit with measurements of the vectors joining the positions of the marks 30 & 40 to those of their respective images. Such vector measurements may be performed manually by the operator and supplied to the central processing unit 324 from the keyboard 326. They may also be performed automatically by detecting the coordinates of a stylus placed successively at the location of a mark and at the location of its image, e.g. by means of a graphics input system using ultrasonic transmitters and receivers as described in above-mentioned Document FR-A-2 698 191.

A second possibility consists in entering data by means of the keyboard 326 so as to modify the coordinates of the images of the marks 30 & 40 until the desired coincidence is obtained, and in storing the required modifications which correspond to the position difference vectors.

After determining the position difference vectors, a layout matching program may be run (FIG. 11).

The position difference vectors are analyzed (stage 370) and, when they express a stretching of the surface area of the hide (test 371), which is the most frequent case of dimensional variation, the image file is transformed (stage 372). This is performed as a function, of the orientations and amplitudes of the position difference vectors so as to cause the hide position information to coincide with the real positions of the marks 30 & 40 on the hide. An example of geometric transformation is a projection (magnification) as a function of the mean amplitude of the position difference vectors. Graphics software performing such transformations of digital image files are well known.

Since the transformation is also applied to the flaw information, it is possible that magnifying a flawed zone affects a piece of the layout that was previously outside said zone. A search for such pieces is thus performed (test 373).

If the search is negative, the program is interrupted and the layout is maintained. In contrast, if a piece is found onto which a magnified flawed zone encroaches, the minimum distance by which the piece must be offset to come out of the flawed zone is determined (stage 374), as well as the direction of the offset. If the offset is possible without affecting an adjacent piece in the layout (test 375), the location of the piece is modified in the layout (stage 376), and any other affected pieces are successively dealt with (test 377). Otherwise, a search is made in the offset direction and to the edge of the hide to determine whether the required offset can be distributed over a plurality of pieces (test 378). In which case, the locations of the pieces are modified in the layout (stage 379), and any other affected pieces are successively dealt with (test 377). Otherwise, the program is interrupted and a new overall layout must be defined on the basis of the transformed image file. This eventuality is normally very rare.

When the position difference vectors exceptionally express a shrinkage (rather than a stretching) of the surface area of the hide (test 371), a corresponding transformation of the image file is performed (stage 381) on the same principle as described above.

If the layout remains included in the transformed image, it is maintained, with the program being interrupted. In contrast, if, after transformation, the layout is not totally included in the image of the hide (test 382), for each piece in question, a search is made for the minimum distance by which it must be offset to be included totally within the surface area of the hide, and for the direction of this offset (stage 383). As above, a search is made to determine whether the piece can be offset by the required distance without encroaching on an adjacent piece (test 384), or, otherwise, whether the required offset can be distributed over a plurality of pieces (test 386), and the layout is modified accordingly (stages 385 and 387) before dealing with the following piece in question (388). If this is impossible, the program is interrupted and a new overall layout must be defined.

It should be noted that layout transformation programs of the same type are known and used for layouts in widths of fabric, when variations (reductions) in width are detected relative to the value used to define the layout.

A cutting-out station is described above comprising handling apparatus and cutting-out apparatus with a system for interchanging work trays therebetween.

Other cutting-out stations of known configuration may be used, in particular cutting-out stations including an endless conveyor whose top run constitutes the work surface. Such conveyors are commonly used for cutting up lay-ups formed of superposed layers of fabric held on the conveyors by suction, the cutting tool being, for example, a vibrating blade. Such conveyor cutting-out stations may be used for cutting up hides or other materials in the context of the method of the invention.

I claim:

1. A method of cutting up sheet material in the form of remnants of non-repetitive shapes and that might be flawed, the method including the following operations:

digitizing the configuration of each remnant so as to generate and record graphics information representative of the shape of the remnant;

generating first position information representative of the configuration of the remnant during digitization;

recording the first position information corresponding to the remnant whose configuration has been digitized;

defining from said graphics information a layout for pieces to be cut out from the remnant so as to use the surface of the remnant optimally;

projecting onto a work surface images whose positions correspond to said recorded first position information; placing the corresponding remnant on the work surface with a configuration corresponding to the projected images; and cutting out the pieces from the placed remnant in compliance with said layout;

whereby said pieces are cut from the remnant in a configuration similar to that which the remnant had during digitization.

2. A method as in claim 1 wherein:

the method further comprises providing the surface of the remnant with first marks characteristic at least of the configuration of the remnant during digitization and detecting the first marks so as to generate the first position information representative of the positions of the first marks;

the images projected onto the work surface are those of the first marks in the positions defined by the recorded first position information; and the corresponding remnant is placed on the work surface by bringing together the marks carried on the surface of the remnant and the projected images of the marks.

3. A method as in claim 2, wherein the first marks include marks situated in positions in which the first marks are most likely to show up as dimensional variations or deformations in the remnant.

4. A method as in claim 3, wherein the first marks characteristic of the orientation of the remnant are different from the first marks showing up as dimensional variations or deformations in the remnant.

5. A method as in claim 2, wherein the first marks include marks characteristic of the disposition of the remnant relative to a frame of reference used during digitization.

6. A method as in claim 2, wherein the first marks are in the form of adhesive patches.

7. A method as in claim 2 further comprising the following steps:

providing the surface of the remnant with second marks indicating the locations of flaws on the remnant as digitized;

detecting the second marks so as to generate second position information representative of the locations of the flaws;

recording the second position information corresponding to the remnant whose configuration is digitized; and using the graphics information representative of the shape of the remnant and the second position information so as to display an image representing the remnant and the locations of the flaws, so as to define the layout while taking into account any flaws on the remnant.

8. A method as in claim 7, wherein the second marks indicate the outlines of the flawed zones of the remnant.

9. A method as in claim 7 further comprising the following steps:

providing the surface of the remnant with third marks situated at the locations of the flaws on the remnant and indicating the seriousness of the flaws;

detecting the third marks so as to generate flaw information representative of the seriousness of the flaws;

recording the flaw seriousness information corresponding to the flaws whose locations are represented by the second position information; and using the flaw seriousness information to display an indication of the seriousness of the corresponding flaw at each of the locations of the flaws on the image representing the remnant and the locations of the flaws.

10. A method as in claim 7, in which an operator defines the layout by looking at an image of the remnant on a screen and by entering data and/or commands by means of apparatus providing an interface with a data-processing system, the interface apparatus and the screen on which the image representing the remnant and the locations of the flaws is displayed mounted to move along a support on which the remnant may be disposed, so as to enable the operator to see simultaneously the image of the location of the flaw and the same flaw as the same flaw really appears on the surface of the remnant.

11. A method as in claim 2, wherein the marks have different shapes depending on what the marks represent.

12. A method as in claim 1, wherein during digitization, a digital image file is generated containing graphic s information representative of the shape of the remnant, remnant position information characteristic of the configuration of the remnant and of the disposition of the remnant during digitization, flaw position information characteristic of the positions of any flaws on the remnant, flaw seriousness information characteristic of the seriousness of any flaws on the remnant, and identification information identifying the remnant.

13. A method as in claim 1 characterized in that, while the layout is being defined, a digital layout file is generated containing information which identifies the locations and outlines of pieces to be cut out from the remnant, information which identifies the pieces to be cut out, and information which identifies the remnant.

14. A method as in claim 2, wherein the marks carried by the surface of the remnant and images of the marks as projected onto the work surface are brought together until they are made to coincide.

15. A method as in claim 2, wherein, when it is impossible to make the positions of the marks carried by the surface of the remnant coincide with images of the marks as projected onto the work surface, the differences between the respective positions are measured, the graphics information and the first position information as recorded are modified by geometrical transformation as a function of the differences as measured, so as to comply with the real positions of the marks as carried by the surface of the remnant on the work surface, and, where applicable, the layout is modified accordingly.

16. A method as in claim 15, wherein the first marks are in the form of adhesive patches and the second position information representative of the locations of any flaws is also modified by geometrical transformation.

17. A method as in claim 15, wherein the differences between the positions are determined by measurement on the work surface.

18. A method according to claim 16, wherein the differences between the positions are determined by modifying the first position information and measuring the modifications required to make the positions of the marks coincide with images of the marks as projected.

19. A method as in claim 2, wherein, after cutting out the pieces from the remnant, images of symbols are projected onto the cut-out pieces so as to facilitate unloading.

20. A method as in claim 19, wherein the images of the symbols are projected by means of the same projection apparatus as that used for projecting the images of the first marks.

21. A method as in claim 19, wherein, when the cut-out pieces are to be used for products having different models and different sizes, the images of particular symbols facilitating marking of the pieces in question are projected successively for the respective models and size-by-size.

22. A method as in claim 21, wherein the successive projections are triggered by remote control.

23. A method as in claim 21, wherein the pieces are unloaded by means of sorting elements identified by symbols identical to those projected onto the pieces, so as to facilitate sorting like pieces into a corresponding sorting element.

24. A method of cutting up sheet material in the form of remnants of non-repetitive shapes and that might be flawed, the method including the following operations:

digitizing the configuration of each remnant so as to generate and record graphics information representative of the shape of the remnant;

generating flaw position information representative of locations of flaws on the remnant during digitization;

recording the flaw position information corresponding to the remnant whose configuration has been digitized;

defining from said graphics information and said flaw position information a layout for pieces to be cut out from the remnant so as to use the surface of the remnant optimally while taking into account any flaws on the remnant;

projecting onto a work surface an image representing the remnant and the locations of the flaws, using the graphics information representative of the shape of the remnant and the flaw position information;

placing the corresponding remnant on the work surface with a configuration corresponding to the projected images; and cutting out the pieces from the placed remnant in compliance with said layout;

whereby said pieces are cut from the remnant in a configuration similar to that which the remnant had during digitization.

25. A method as in claim 24, wherein the flaw position information indicates outlines of flawed zones of the remnant.

26. A method as in claim 24 further comprising the following steps:

generating flaw seriousness information representative of the seriousness of the flaws;

recording the flaw seriousness information corresponding to the flaws whose locations are represented by the flaw position information; and using the flaw seriousness information to display an indication of the seriousness of the corresponding flaw at each of the locations of the flaws on the image representing the remnant and the locations of the flaws.

27. A method as in claim 24, in which an operator defines the layout by looking at an image of the remnant on a screen and by entering data and/or commands by means of apparatus providing an interface with a data-processing system, the interface apparatus and the screen on which the image representing the remnant and the locations of the flaws is displayed mounted to move along a support on which the remnant may be disposed, so as to enable the operator to see simultaneously the image of the location of the flaw and the same flaw as the same flaw really appears on the surface of the remnant.

* * * * *